UNITED STATES PATENT OFFICE 2,444,400

PROCESS FOR PRODUCING PHENYLACETALDEHYDE FROM STYRENE GLYCOL

William S. Emerson, Dayton, Ohio, assignor to Monsanto Chemical Company, a corporation of Delaware No Drawing. Application August 30, 1943, Serial No. 500,542

2 Claims. (Cl. 260—599)

This invention relates to the manufacture of aryl-substituted acetaldehydes and more particularly to a process for the manufacture of phenylacetaldehyde or its nuclear and alpha-alkyl derivatives.

An object of this invention is to provide an improved process of producing aryl-substituted acetaldehydes by the vapor phase dehydration and rearrangement of the glycols of vinyl aromatic compounds, substantially according to the equation:

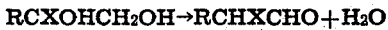

$$RCXOHCH_2OH \rightarrow RCHXCHO + H_2O$$

wherein R is a substituted or unsubstituted aromatic hydrocarbon radical and X is hydrogen or an alkyl group such as methyl, ethyl, propyl, etc., i. e. having from 1 to 3 carbons. As examples of aryl-substituted acetaldehydes which may be prepared in this manner may be mentioned phenylacetaldehyde, nuclear derivatives of phenylacetaldehyde such as ortho- meta- or para-tolylacetaldehyde, the xylylacetaldehydes, the chlorophenylacetaldehydes, the bromophenylacetaldehydes, the fluorophenylacetaldehydes, the alkoxy-substituted phenylacetaldehydes such as p-methoxyphenylacetaldehyde, the alpha-alkyl phenylacetaldehydes such as alpha-methylphenylacetaldehyde, napththylacetaldehyde, etc.

In the prior art, phenylacetaldehyde or its nuclear substituted derivatives have been prepared by a variety of methods, but these have not been applicable to the production of such compounds on a commercial scale. For example, according to Whitmore (Organic Chemistry, 1937, p. 794) phenylacetaldehyde is best prepared from cinnamic acid by first adding hypochlorous acid and then rearranging and decarboxylating the product. This method, however, is of little practical importance in that cinnamic acid, itself, is not really available. Phenylacetaldehyde is also obtainable by the action of silver nitrate on styrene iodohydrin or by the action of dilute sulfuric acid on styryl alkyl or aryl ethers (Ber. 14, 1868, Ber. 38, 1963, Ann. 308, 270). The low yields obtained by these methods as well as the comparative unavailability of some of the reagents employed make them unsuitable for commercial use. Also, according to Zincke (Ann. 216, 301) phenylacetaldehyde is obtainable by heating styrene glycol with from 15 to 20 times its volume of dilute sulfuric acid for about one hour. While yields concerning the extent of such conversion are not reported, I have found that the Zincke process is not suitable for commercial application because low yields are obtained, due to the considerable amounts of resinous materials and other by-products that are formed in addition to the phenylacetaldehyde. Moreover, objectionably large volumes of dilute sulfuric acid are required by the process.

Now I have found that the production of phenylacetaldehyde from styrene glycol is considerably simplified by conducting the reaction in a continuous manner under conditions which will be hereinafter described.

According to this invention good yields of aryl-substituted acetaldehydes and the alpha-alkyl derivatives thereof are obtainable by passing vapors of a glycol of a vinyl aromatic compound or a glycol of an alpha-alkyl substituted vinyl aromatic compound and steam over a substantially neutral or acidic surface catalyst at a temperature substantially within the range of about 150.° C. to about 600° C. It has also been found that while temperatures within this range yield good results, far better yields are obtained when the operating temperatures fall within the preferred range of about 200° C. to about 400° C. For example, phenylacetaldehyde is obtainable in yields of the order of 72% to 90% by passing vapors of styrene glycol with steam over non-basic, that is, substantially neutral or acidic surface catalysts at temperatures of from 200° C. to about 400° C. The present method accordingly provides a continuous and more economically feasible method for the manufacture of this aldehyde than has been heretofore proposed. In practice I prefer to operate as follows:

I pack a quartz tube having an internal diameter of about 1 inch and length of about 18 inches with a substantially neutral or acidic surface catalyst, for example, phosphoric acid on pumice. I apply external heat, raising the temperature of the interior of the tube from approximately 150° C. to about 600° C., depending upon the nature of the catalyst employed. Into the catalyst tube I then introduce through one conductor the volatilized styrene glycol and through another conductor an excess of superheated steam. Instead of the volatilized glycol I may employ the liquid glycol; in this case, however, I apply heat to the conducting tube in such a manner as to keep the reactant in the liquid state and then volatilize it before it enters the catalyst tube. When operating on a small scale, the liquid glycol or a solution of it in a solvent such as alcohol may also be dropped slowly on to the hot top of the catalyst chamber, volatilization of the liquid occurring before it comes into contact with the strongly heated catalyst. The rate at which the steam and the glycol are passed through the catalyst tube depends upon the rate at which heat is supplied to the catalyst tube. In the laboratory experiments, employing the catalyst tube described above, I find that very good results are obtainable by passage of the styrene glycol at the rate of about 1 gram every 30 to 120 seconds. In selecting both the optimum temperature and the optimum rate of addition of the reactants, care must be observed to maintain both rate and temperature high enough to avoid condensation and low enough to avoid the formation of tarry products in the catalyst chamber.

As far as I am able to ascertain, the vapor phase conversion of styrene glycols or glycols of other vinyl aromatic compounds into phenylacetaldehyde or the nuclear and/or alpha-alkyl derivatives thereof by passage of the glycols in the vapor state over substantially neutral or acidic surface catalysts at elevated temperatures has not been hitherto disclosed. While I am aware of the vapor phase dehydration of aliphatic glycols into the corresponding aldehydes, for example, as described in British Patent No. 539,030 to Henry Dreyfus, this purely aliphatic reaction could not have anticipated the behavior of styrene glycol or the glycols of other vinyl aromatic compounds when submitted to dehydrating conditions in the vapor phase and in the presence of neutral or acidic catalysts. Styrene glycols, being unsymmetrical molecules, could undergo dehydration to give a number of products. For example, while Zincke (Ann. 216, 301) has shown that the liquid phase dehydration of styrene glycol in the presence of aqueous sulfuric acid yields phenylacetaldehyde, Palfray, Sabetay and Sontag (Comptes rendus, 193, 941-4(1931)) later showed that liquid phase dehydration of styrene glycol in presence of potassium hydroxide yields not phenylacetaldehyde but phenylmethylcarbinol. Hence from the prior art, the product into which styrene glycol would be converted when reacted in the vapor phase in the presence of neutral or substantially acidic catalysts could not be predicted.

The invention is further illustrated, but not limited, by the following examples:

*Example 1*

20 grams of styrene glycol dissolved in 30 cc. of ethyl alcohol was passed through a quartz tube, packed with a catalyst consisting of phosphoric acid on pumice, for 35 minutes at a temperature of 200° C. to 225° C. and a pressure of 103-125 mm. of mercury. Simultaneously, an excess of steam was introduced into the reaction tube. At the end of the run, steam was led into the catalyst tube for approximately ten minutes in order to drive out any retained reaction products or reactants. The contents of the receiving flask were extracted 3 times with benzene. The benzene extract was combined with washings obtained by treatment of the interior of the catalyst tube with one 50 cc. portion of benzene, and the whole was distilled under partial vacuum, 10 grams (58% theoretical yield) of phenylacetaldehyde, B. P. 90°-93° C./17 mm., $n_D^{25}$ 1.5238, being obtained.

*Example 2*

I operate as in Example 1, except that instead of using the temperature and pressure employed in Example 1, I now use a temperature of from 550° C. to 600° C. and a pressure of from 125 to 165 mm. of mercury. There is thus obtained 12.5 grams (72% theoretical yield) of substantially pure phenylacetaldehyde, B. P. 84°-88° C./15 mm., $n_D^{25}$ 1.5250.

*Example 3*

I operate as in Example 1, except that instead of a phosphoric acid-pumice catalyst I employ glass beads as a neutral catalyst. Also, instead of employing the temperatures employed in Example 1, in this case the run is conducted at a temperature of 325° C. to 350° C. Operating in this manner there is obtained 10 grams of substantially pure phenylacetaldehyde, B. P. 89°-92° C./18 mm., $n_D^{25}$ 1.5255.

*Example 4*

I operate as in Example 1, except that instead of the phosphoric acid-pumice catalyst I use a catalyst comprising calcium carbonate on silica gel, prepared by washing the silica gel with aqueous calcium chloride, then treating it with aqueous ammonium carbonate and ammonium hydroxide, and finally evaporating to dryness and subliming out the ammonium chloride. Also, instead of employing the operating conditions described in Example 1, in this case the run is conducted at a temperature of 325° C. to 350° C. and a time of one hour and 10 minutes. Operating in this manner there was obtained 10 grams of substantially pure phenylacetaldehyde, B. P. 90°-94° C./17 mm., $n_D^{25}$ 1.5269.

In view of the fact that styrene glycol melts at 67° C.-68° C. and boils at 272° C.-274° C. at atmospheric pressure (144° C.-185° C. at 20 mm.) various means may be employed for introducing styrene glycol into the catalyst zone. As pointed out above, the styrene glycol may be dissolved in a solvent such as alcohol so as to produce a solution and the solution so formed may be dropped onto a heated surface so as to volatilize the glycol, after which the vapors are conducted into the catalyst bed. On the other hand, another convenient way is to form a mixture of water vapor and styrene glycol vapor by steam distilling the glycol from a boiler and then passing the vapors so formed into and through the catalyst bed.

The dehydration and rearrangement of styrene glycol to phenylacetaldehyde may be carried out at pressures above or below normal atmospheric pressure, although the most convenient way consists in working under reduced pressures, in such a manner as to draw the mixed vapors with and through the catalyst bed by reduced pressure applied to a receiver or condenser attached to the catalyst tube.

The same considerations as above apply to the dehydration of substituted styrene glycols.

Instead of phosphoric acid on pumice, glass beads of calcium carbonate on silica gel, I may employ other neutral or acidic surface catalysts such as solid acids or solid acidic salts. I may use for example, fuller's earth, kieselguhr, diatomaceous earth, kaolin, silica, Carborundum, Norbide (boron carbide), pumice or other argillaceous or siliceous substantially neutral or acidic minerals or materials. Other acidic surface catalysts which may be employed are, for example, phosphoric acid on a solid carrier such as carbon or activated carbon, phosphoric acid on silica, pumice or alumina, sodium bisulfate in solid form or on silica. When ortho-phosphoric acid on a solid carrier is employed, the dehydrated forms of ortho-phosphoric acid are produced. Thus for example, ortho-phosphoric acid may form pyro- or meta-phosphoric acid and if suitable mineral matter containing metals such as calcium, magnesium, barium, aluminum, boron, sodium, potassium, zinc, cadmium or strontium are present, the acid or neutral pyro- or meta-phosphates of these metals are formed. These substances serve as excellent catalysts for the present reaction.

While the above examples are limited to the preparation of phenylacetaldehyde, the present process is also applicable to the preparation of nuclearly or alpha-alkyl substituted phenylacetaldehydes or to naphthylacetaldehyde and the nuclear or alpha-alkyl derivatives thereof, for example, the tolylacetaldehydes, the xylylacetaldehydes, the halogen substituted phenylacetaldehydes such as the chlorophenylacetaldehydes, p-methoxyphenylacetaldehyde, o-ethoxyphenylacetaldehyde, alpha-methylphenylacetaldehyde, alpha-propylphenylacetaldehyde, alpha-naphthylacetaldehyde, etc.

What I claim is:
1. The process for producing phenylacetaldehyde which comprises subjecting the vapor of styrene glycol to contact with a phosphoric acid on a solid carrier at a temperature in the range of 150° C. to 600° C.
2. The process defined in claim 1 in which the phosphoric acid is selected from the group consisting of ortho-, pyro- and meta-phosphoric acid.

WILLIAM S. EMERSON.

REFERENCES CITED

The following references are of record in the file of this patent:

FOREIGN PATENTS

| Number | Country | Date |
|--------|---------|------|
| 539,030 | Great Britain | Dec. 31, 1940 |

OTHER REFERENCES

Wurtz: "Annalen der Chem.," vol. 108, pages 84 to 88 (1858).

Zincke: "Annalen der Chem.," vol. 216, pages 301, 302 and 303 (1882).